US012687450B2

(12) United States Patent　　　　　(10) Patent No.: US 12,687,450 B2
Hilgers　　　　　　　　　　　　　　　(45) Date of Patent:　　Jul. 21, 2026

(54) FUNCTIONALLY TESTING A LEAK DETECTION DEVICE FOR CHECKING THE SEALING TIGHTNESS OF AN INSPECTION OBJECT FILLED WITH A LIQUID

(71) Applicant: INFICON GMBH, Cologne (DE)

(72) Inventor: Heike Hilgers, Cologne (DE)

(73) Assignee: INFICON GMBH, Cologne (DE)

( * ) Notice: Subject to any disclaimer, the term of this patent is extended or adjusted under 35 U.S.C. 154(b) by 283 days.

(21) Appl. No.: 18/280,703

(22) PCT Filed: Feb. 3, 2022

(86) PCT No.: PCT/EP2022/052537
§ 371 (c)(1),
(2) Date: Sep. 7, 2023

(87) PCT Pub. No.: WO2022/199917
PCT Pub. Date: Sep. 29, 2022

(65) Prior Publication Data
US 2024/0159616 A1　　　May 16, 2024

(30) Foreign Application Priority Data
Mar. 22, 2021　(DE) ..................... 10 2021 107 055.4

(51) Int. Cl.
*G01M 3/20*　　　　(2006.01)
*H01M 10/42*　　　(2006.01)
(52) U.S. Cl.
CPC ....... *G01M 3/205* (2013.01); *H01M 10/4228* (2013.01)
(58) Field of Classification Search
CPC ...... G01M 3/205; G01M 3/207; G01M 3/226; G01M 3/229; H01M 10/4228; H01M 10/0525
See application file for complete search history.

(56) References Cited

U.S. PATENT DOCUMENTS 8,646,315 B2 * 2/2014 Wetzig .................... G01M 3/20
73/49.3
10,073,001 B2 * 9/2018 Luedolph .............. G01M 3/202
(Continued)

FOREIGN PATENT DOCUMENTS

CN　　102187193 A　　9/2011
CN　　209802601 U　　12/2019
(Continued)

OTHER PUBLICATIONS

Kuz'Min V V: "Precise Measurements of Small Gas Flows—Metrological Basis for the Calibration of Leak Detectors", Measurements Techniques, vol. 40, No. 2, Feb. 1, 1997, pp. 130-134, XP-000754715, ISSN: 0543-1972.

*Primary Examiner* — Freddie Kirkland, III
(74) *Attorney, Agent, or Firm* — Dickinson Wright PLLC

(57)　　　　　ABSTRACT

A test leak device for functional testing of a leak detection device for the leak test of a test specimen (14) filled with a liquid (12) having an internal pressure that is lower than atmospheric pressure, comprising a reservoir (102) filled with a test liquid (104), wherein the test liquid (104) has a vapor pressure of less than 500 mbar at room temperature, and the reservoir (102) comprises an outlet (106), and a pump (100) cooperating with the reservoir (102) and configured to convey the test liquid (104) from the reservoir (102) in such a way that the test liquid (104) escapes from the pump (100) through the outlet (106) in liquid form from the reservoir (102).

13 Claims, 2 Drawing Sheets

(56) References Cited

U.S. PATENT DOCUMENTS

Figure 1:
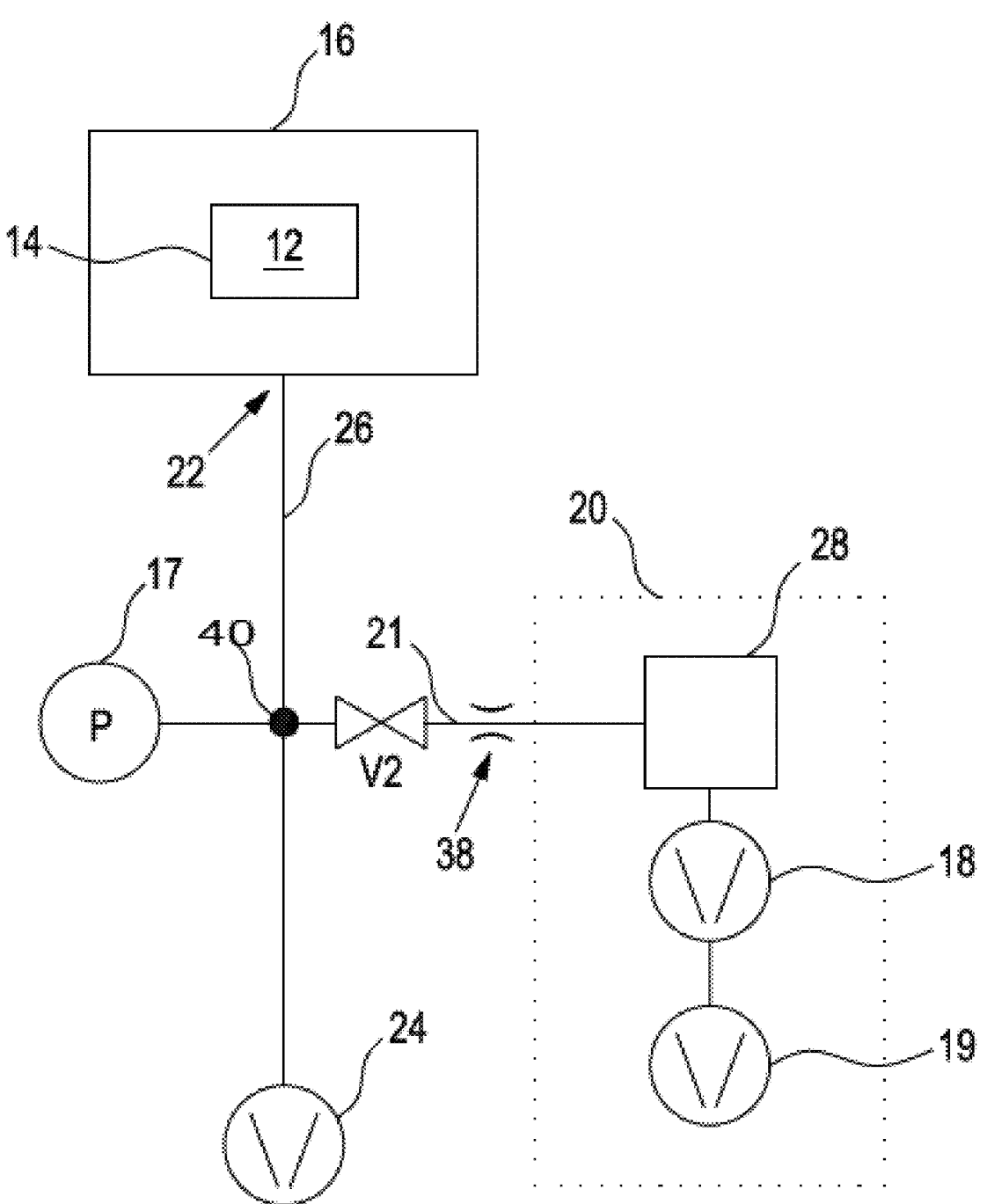

| | | | |
|---|---|---|---|
| 10,401,255 B1 * | 9/2019 | Chamberlain | G01M 3/2815 |
| 11,060,944 B2 * | 7/2021 | Regef | G01M 3/32 |
| 12,315,892 B2 * | 5/2025 | Reismann | H01M 10/0525 |
| 2009/0100909 A1 * | 4/2009 | Grosse Bley | G01M 3/229 |
| | | | 73/40.7 |
| 2010/0313634 A1 * | 12/2010 | Wetzig | G01M 3/226 |
| | | | 73/40.7 |
| 2014/0096595 A1 * | 4/2014 | Wetzig | G01M 3/229 |
| | | | 73/40.7 |
| 2017/0089339 A1 | 3/2017 | Muller et al. | |
| 2022/0181709 A1 * | 6/2022 | Reismann | G01M 3/229 |
| 2023/0221204 A1 * | 7/2023 | Nakagawa | G01M 3/20 |
| | | | 73/40 |

FOREIGN PATENT DOCUMENTS

| | | | | |
|---|---|---|---|---|
| DE | 202011108226 U | 1/2012 | | |
| DE | 202019005500 U | 10/2020 | | |
| DE | 202019005500 U1 * | 10/2020 | | G01M 3/229 |
| DE | 10 2019 121462 A1 | 2/2021 | | |
| JP | 2012-154720 A | 8/2012 | | |
| WO | 2012-005199 A | 1/2012 | | |

* cited by examiner

100

106

DMC

104

102

FUNCTIONALLY TESTING A LEAK DETECTION DEVICE FOR CHECKING THE SEALING TIGHTNESS OF AN INSPECTION OBJECT FILLED WITH A LIQUID

The invention relates to a device and a method for functional testing of a leak detection device for the leak test of a test specimen filled with a liquid.

It is known that a leak detection is performed for a test specimen filled with a liquid, such as a battery, in order to test the tightness of the test specimen. Typically, there is no gas available within the test specimen as a test gas in such test specimens and the test specimen cannot or should not be actively filled with a separate test gas. This is the case, for example, with batteries filled with electrolyte liquids, such as a lithium-ion battery filled with electrolyte, wherein the electrolyte contains the solvent dimethyl carbonate as an essential component.

The leak detection of such test specimens is based on the principle of detecting parts of the liquid within the test specimen flowing out from the inside of the test specimen through a leak with the aid of a detector. For leak testing, the test specimen is introduced into a vacuum chamber. Parts of the liquid that escape from the test specimen are continuously conveyed out of the vacuum chamber by means of a vacuum system of a vacuum pump and are supplied to a suitable sensor.

In the refrigeration/air conditioning industry, it is well known to test test specimens filled with a liquid refrigerant—for example heat exchangers—for leaks. A peculiarity of these test specimens is that the liquid refrigerant is contained in the test specimen under overpressure in order to obtain the liquid phase of the refrigerant. For leak testing of such test specimens filled with liquid refrigerant, a sniffer probe is guided along the areas of the test specimen to be tested for leaks, wherein said sniffer probe sucks in refrigerant escaping from a leak into the external atmosphere and thus evaporating, and supplies said refrigerant to a gas detector. The sniffer probe sucks in air from the environment of the test specimen and thus picks up escaping leakage gas, which is selectively detected by a corresponding sensor and thereby distinguished from the sucked-in air components.

In the case of a test specimen filled with a liquid whose internal pressure is lower than atmospheric pressure in the external environment of the test specimen (e.g. an internal pressure in the range of approx. 50-500 mbar), the sniffer leak detection method is not applicable because in the event of a leak no leakage gas will escape to the outside. For example, in the case of batteries filled with a liquid electrolyte with low vapor pressure and in which negative pressure prevails, air from the external test specimen environment penetrates into the interior of the test specimen in the event of a leakage. The leak cannot be detected with the aid of a sniffer probe.

Conventional calibration devices or test leak devices cannot be used to verify the functionality of a leak detection device of the type described above. This is because conventional test leaks are based on the principle of storing the test liquid in a reservoir and leading it out of the reservoir through a capillary or a membrane. However, in the present leak detection device, a test liquid with a low vapor pressure of less than 500 mbar at room temperature is to be used. The solvent ethylene acetate, for example, has a vapor pressure of 103 mbar at 20° C. Such test liquids cannot be admitted to the detection system in sufficient quantity through a capillary or membrane via a pressure difference.

Against this background, the object of the invention is to provide an improved test leak device and an improved method for functional testing of a leak detection device for the leak test of a test specimen filled with a liquid.

The test leak device according to the invention is defined by the features of claim 1.

Accordingly, a reservoir is filled with a test liquid that has a vapor pressure of less than 500 mbar at room temperature. The reservoir comprises an outlet for the test liquid. The characteristic of the device according to the invention is that a pump, which is configured to convey the test liquid from the reservoir, cooperates with the reservoir in such a way that the test liquid escapes from the pump through the outlet in liquid form from the reservoir. With the aid of the pump, it is possible to feed even liquids with low vapor pressure into the leak detection device with sufficient quantity per conveying operation.

The pump can be, for example, a micro-metering pump configured to deliver a flow rate of less than 100 µl and preferably less than 100 nl of the test liquid from the outlet per conveying operation. The test leak device, the pump and/or the outlet can be configured to convey the test liquid from the outlet as spray mist. The pump can comprise a piezo liquid metering device for metering the flow rate to be delivered by the pump per conveying operation.

The test specimen can be a battery, for example. The liquid within the test specimen and/or the test liquid may be an electrolyte or an individual component of an electrolyte.

The method according to the invention is defined by the features of claim 6. Accordingly, the test chamber of the leak detection device is first brought to a pressure lower than atmospheric pressure. A predetermined amount of a test liquid is then delivered into the test chamber, which has a vapor pressure of less than 500 mbar at room temperature. The delivered amount of test liquid is then transported to a detector of the leak detection device and detected by the detector. In this case, the test liquid can be supplied to the detector in the form of molecular particles in evaporated form. Evaporation typically occurs after the test liquid escaped from the outlet of the test leak device. Typically, the test liquid evaporates here at the outlet of the leak channel or the outlet channels, which forms the outlet from the reservoir.

Preferably, the pump is configured to convey a predetermined amount of the test liquid per conveying operation, for example in the form of a pump stroke from the outlet. In doing so, less than 100 µl and preferably less than 100 nl of the test liquid should be conveyed from the outlet per conveying operation. The test liquid can be in diluted form.

The test liquid can be conveyed from the outlet as spray mist. Alternatively, it is conceivable that the test liquid evaporates through the outlet after leaving the reservoir and is thus present in gaseous form outside the reservoir.

The pump can be arranged between the reservoir and the outlet of the test leak device and is thus fluidly connected to the reservoir and the outlet.

It is conceivable that no carrier gas is supplied to the test chamber from the outside, for example from a carrier gas source connected to the test chamber or taken from the environment of the test chamber. In particular, this does not result in a gas flow that is guided along the surface of the test specimen. Rather, the parts or particles of the test liquid are drawn from the test chamber together with residual gas components and supplied to the detector. Here, the carrier gas is not required.

The test chamber can be designed as a rigid test chamber with rigidly formed walls. Alternatively, the test chamber can also be designed as a film chamber, which is characterized by having at least one flexible wall area that is sucked against the test specimen during evacuation and reduces the volume of the film chamber. In addition, film chambers, in particular with walls consisting entirely of a flexible film, offer the advantage that the walls sucked against the test specimen support the test specimen, which is particularly advantageous in the case of a flexible test specimen.

The detector comprises a sensor that selectively detects the parts or particles of the liquid to be detected and can thereby distinguish them from other parts or gases. The parts of the escaped liquid can be in liquid form and supplied to the detector. In this respect, the detector must be able to analyze liquids and selectively detect the liquid contained in the test specimen. The escaped liquid and the test liquid can be supplied to the detector in the form of a mist or aerosol, for example.

Alternatively, it can be provided that the liquid evaporates when it escapes from a leak in the test specimen and the escaped parts of the liquid are supplied to the detector in evaporated form, i.e. in gaseous phase. The detector must then be designed as a gas detector and be able to analyze gases and selectively distinguish the liquid in the test specimen in its gaseous phase from other gases. The decisive factor here is that the liquid contained in the test specimen does not make the change from the liquid phase to its gaseous phase until it leaves the test specimen, i.e. outside the test specimen or in the opening or channel of the leak. Thus, no gas present in the test specimen is used as the test gas because the liquid within the test specimen is in liquid form, even if the liquid escapes through a leak and evaporates in doing so.

The detector for the parts of the liquid to be detected may be a gas detector, such as a mass spectrometer, a gas chromatograph, an infrared radiation absorption detector, or a detector with chemical sensors or semiconductor sensors.

Preferably, the gas flow transporting the parts of the liquid is not supplied to the detector until a pressure limit value is reached in the test chamber or in the connecting line between the test chamber and the vacuum pump evacuating the test chamber. This pressure limit value can be between approximately 2 mbar and 50 mbar and is preferably less than 20 mbar.

The vacuum pump, which is preferably a membrane pump, can be connected via a valve to the test chamber and/or to the gas line connecting the vacuum pump and the test chamber. At the beginning of the evacuation of the test chamber, the valve is closed. When the pressure limit value is reached, the valve is opened and a partial flow reaches the detector, while the remaining main gas flow continues to be drawn by the membrane pump. Here, in particular in conjunction with a vacuum pump in the form of a membrane pump, an accumulation of the liquid parts escaping from a leak is achieved, unlike with a conventional carrier gas method. When the pressure limit value is reached, the parts of the liquid accumulated up to that point are supplied to the detector.

Advantageously, it is provided that the test specimen in the test chamber is purged with a purge gas to remove any parts of the liquid adhering to the test specimen before the functional test is performed. Preferably, the test specimen is purged with purge gas before the actual leak detection or functional test takes place, e.g. before the test chamber is evacuated.

It is conceivable that the parts of the test liquid within the test chamber or in the connecting line are accumulated during a period of time before the test liquid is supplied to the detector for analysis.

Figure 2:
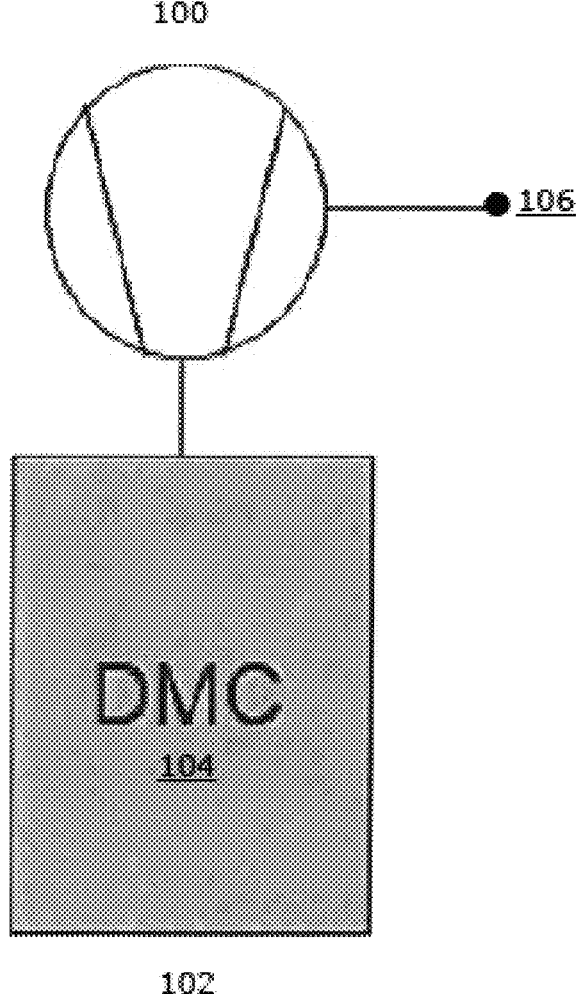

In the following, an exemplary embodiment of the invention is explained in more detail with reference to the Figures. In the Figures:

FIG. 1 is a block diagram of an exemplary embodiment of the leak detection device, and FIG. 2 is a block diagram of an exemplary embodiment of the test leak device.

In the exemplary embodiment, a test specimen 14 filled with a liquid 12 is contained in a test chamber 16. Test specimen 14 is a battery filled with a liquid electrolyte. In the present exemplary embodiment, test chamber 16 is a conventional rigid test chamber.

Test chamber 16 is provided with a vacuum connection 22 to which a vacuum pump 24 is connected which can be used to evacuate test chamber 16. For this purpose, vacuum pump 24 comprises at least one vacuum pump in the form of a membrane pump. Test chamber 16 and vacuum pump 24 are connected to each other in a gas-conducting manner by a connecting line 26 so that vacuum pump 24 can draw gas from test chamber 16 via connecting line 26.

A detector 28 for analyzing and detecting parts of liquid 12 is connected to connecting line 26 which connects vacuum pump 24 to test chamber 16. In both exemplary embodiments, detector 28 is a selective gas detector, for example in the form of a mass spectrometer, whose sensor selectively detects molecular particles of liquid 12 and can distinguish them from other gases. Detector 28 is part of a mass spectrometric vacuum system 20, which includes a pre-vacuum pump 19 and a high vacuum pump 18 for evacuating mass spectrometer 28.

Detector 28 is connected to connecting line 26 in a gas-conducting manner via a gas-conducting detection line 21. Detection line 21 is provided with a throttle 38 for throttling the gas flow diverted from connecting line 26, and with a valve V2 for selectively closing detection line 21. To measure the pressure within connecting line 26, the latter is connected to a pressure sensor 17 in a gas-conducting manner.

Parts of liquid 12 escape from a leak in test specimen 14 and enter into test chamber 16. As liquid 12 escapes from test specimen 14, it may evaporate so that the escaped parts of liquid 12 may be in gaseous form.

Detector 28 is operated as a mass spectrometer in vacuum system 20 at a pressure less than the pressure within test chamber 16 and less than the pressure at connecting point 40 between connecting line 26 and detection line 21. However, in membrane pump 24 used according to the invention to evacuate test chamber 16, no high vacuum is generated within test chamber 16. Rather, membrane pump 24 generates a pressure in the range of a few millibars. Membrane pump 24 draws any residual gas components still present from test chamber 16. In addition, when a pressure in the range of about 10 mbar is reached within test chamber 16, gas components desorb from the walls of the test chamber, which are also drawn by membrane pump 24. Said gas components, i.e. residual gas components from test chamber 16 and gas components desorbing from its walls, absorb parts of liquid 12 that enter into test chamber 16 through a leak from test specimen 14. Said parts of liquid 12 are supplied to detector 28.

The vacuum pressure inside test chamber 16 after evacuation is a few millibars. The diffusion of the parts of liquid 12 that have escaped from test specimen 14 and evaporated is still inert at this pressure. The transportation of the escaped parts of liquid 12 to detector 28 is accelerated with the gas components without using a carrier gas and supplying it to test chamber 16 from the outside.

The functionality of the leak detection device is tested with the test leak device illustrated in FIG. 2. Here, a calibration of the leak detection device can also be performed with the aid of the test leak device. The test leak device comprises a reservoir 102 filled with a test liquid 104. In the present exemplary embodiment, the test liquid is the solvent dimethyl carbonate. A pump 100 pumps test liquid 104 from reservoir 102 to outlet 106 and out of outlet 106.

Pump 100 conveys test liquid 104 in liquid form out of outlet 106. Depending on the pressure conditions in test chamber 16, it is conceivable that the test liquid escaping from outlet 106 forms an aerosol in the form of a spray mist or evaporates and changes to the gaseous phase. The parts of the test liquid that escaped from outlet 106 in this way are transported to detector 28 and analyzed thereby. In doing so, the measured detection signal is assigned to the known predetermined quantity of the test liquid, in the sense of calibrating detector 28.

It is conceivable that the parts of the liquid that escaped from outlet 106 are accumulated within test chamber 16 or within connecting line 26 before the escaped parts of test liquid 104 are supplied to detector 20. To this end, it is conceivable that a valve not shown in FIG. 1 is provided between connecting point 40 and membrane pump 24, which valve is closed when sufficient vacuum pressure is reached within test chamber 16 to cause an accumulation of the escaped liquid parts within test chamber 16 or in connecting line 26 between test chamber 16 and the valve not shown before detection occurs. Valve V2 can be opened for detection. During the accumulation phase, valve V2 can be closed or open.

The invention claimed is:

1. A test leak device for functional testing of a leak detection device for the leak test of a test specimen within a test chamber of the leak detection device, said test specimen filled with a liquid and having an internal pressure that is lower than atmospheric pressure, comprising a reservoir filled with a test liquid, wherein the test liquid has a vapor pressure of less than 500 mbar at room temperature, and the reservoir comprises an outlet, and a pump cooperating with the reservoir and configured to convey the test liquid from the reservoir in such a way that the test liquid escapes from the pump through the outlet in liquid form from the reservoir.

2. The test leak device according to claim 1, wherein the pump is a micro-metering pump configured to deliver a flow rate of less than 100 µl of the test liquid from the outlet per conveying operation.

3. The test leak device according to claim 1, wherein the test leak device, the pump and/or the outlet are configured to convey the test liquid from the outlet as spray mist.

4. The test leak device according to claim 1, wherein the pump comprises a piezo liquid metering device for metering the flow rate to be delivered by the pump per conveying operation.

5. The test leak device according to claim 1, wherein the test specimen is a battery, the liquid is an electrolyte or solvent, and/or the test liquid is an electrolyte or solvent.

6. A method for functional testing of a leak detection device for the leak test of a test specimen filled with a liquid, the test specimen having an internal pressure that is lower than atmospheric pressure, comprising the steps of evacuating a test chamber of the leak detection device to a pressure lower than atmospheric pressure, conveying a predetermined amount of a test liquid from a reservoir by a pump cooperating with said reservoir, which test liquid has a vapor pressure of less than 500 mbar at room temperature, into the test chamber, transporting the delivered amount of test liquid to a detector of the leak detection device, and detecting the transported amount of test liquid by means of the detector to thereby test the functionality of the detector.

7. The method according to claim 6, wherein a flow rate of less than 100 µl of the test liquid is conveyed from an outlet of said reservoir during a conveying operation.

8. The method according to claim 6, wherein the test liquid is conveyed from an outlet of said reservoir as spray mist.

9. The method according to claim 6, wherein the test liquid is drawn from the test chamber together with residual gas components and/or together with gas components desorbing from a wall of the test chamber and is supplied to the detector without a separate carrier gas being supplied to the test chamber from the outside.

10. The method according to claim 6, wherein the detector is a gas detector.

11. The method according to claim 6, wherein the detector is operated in a vacuum system with a lower pressure than the pressure within the test chamber.

12. The method according to claim 6, wherein the test liquid is accumulated in the test chamber, or in a connecting line connecting the test chamber and a vacuum pump evacuating the test chamber, during a period of time before the test liquid is detected by means of the detector.

13. The method according to claim 6, wherein the test liquid is not supplied to the detector until a predetermined pressure limit value is reached in the test chamber.

* * * * *